Dec. 20, 1966    S. ENGELSTEIN    3,292,292
SUSPENSION TYPE APERTURE CARD
Filed Jan. 29, 1963
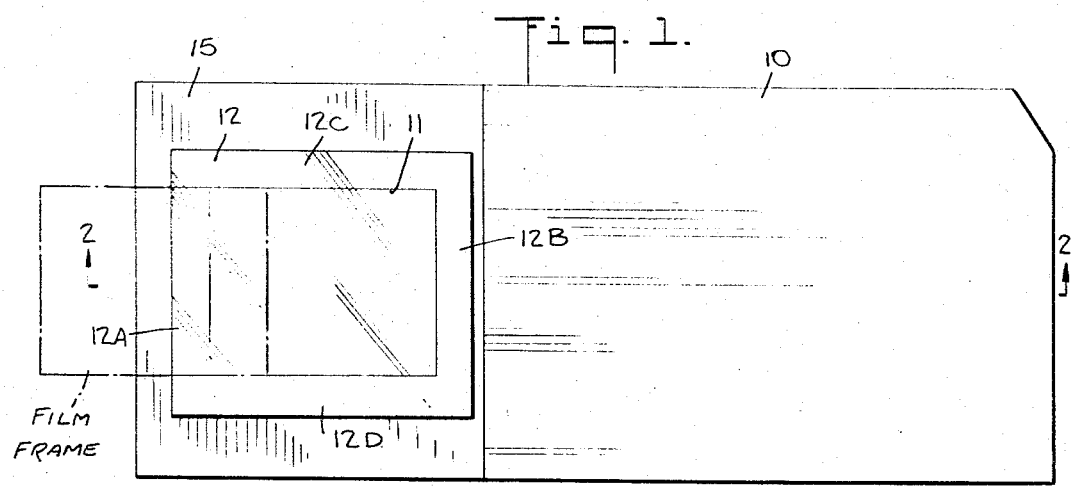
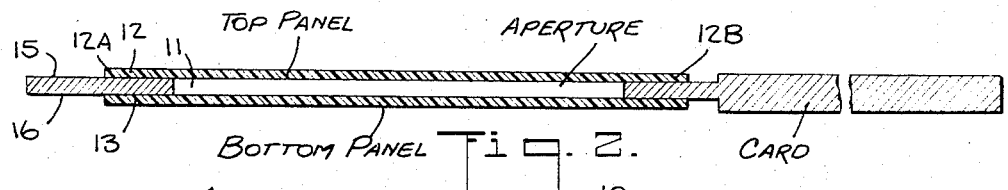
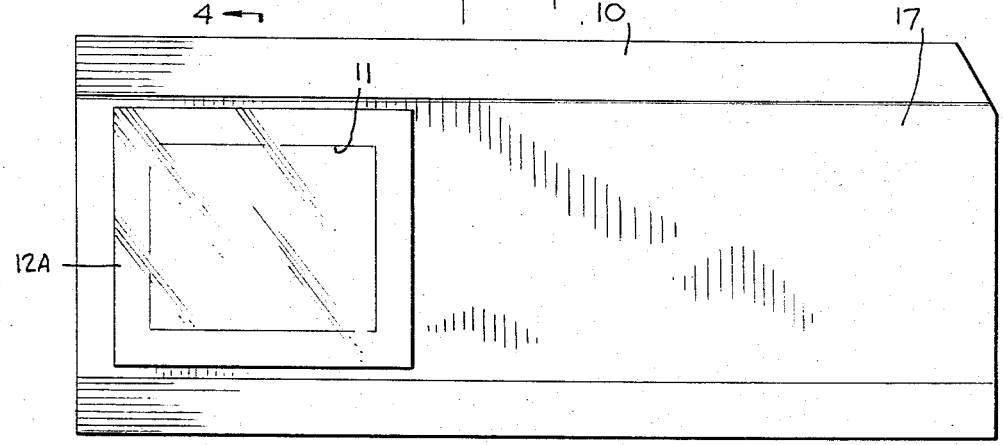
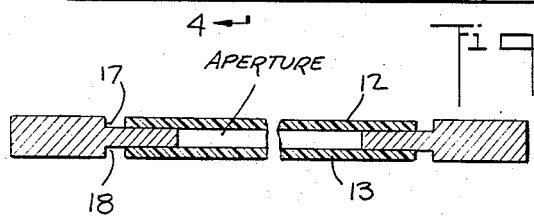
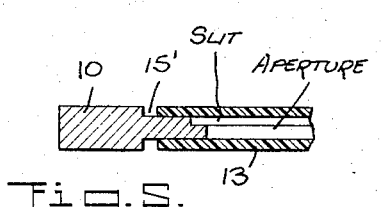
INVENTOR.
STANLEY ENGELSTEIN
BY
ATTORNEY United States Patent Office 3,292,292
Patented Dec. 20, 1966

3,292,292
SUSPENSION TYPE APERTURE CARD
Stanley Engelstein, 320 West End Ave., New York, N.Y.
Filed Jan. 29, 1963, Ser. No. 254,709
1 Claim. (Cl. 40—158)

This invention relates generally to aperture cards for mounting microfilm slides and the like, and more particularly to an improved aperture card for suspending a slide or transparency within the aperture thereof without adhesive.

Card record systems are known wherein microfilms mounted on cards are stored in a filing system adapted to index, classify and sort the film, whereby a desired film may be selected for optical projection or for photographic reproduction. For example, engineering drawings may be reduced to microfilm and stored in such card systems, the drawings being selectively available for inspection. The films may be mounted in cards perforated for use in conjunction with sorting and classifying punch card machines of the standard types. Such machines function to arrange the cards in accordance with the location of the perforations, so that the cards may later be processed to select those which contain film having the desired subject matter. In other instances, the films may be mounted on cards forming part of an alphabetically arranged index or any other coded form of filing system.

One well known type of record card for mounting film, such as that disclosed in the patents to Langan 2,511,859 and 2,512,105, takes the form of a card having a window covered by a transparent sheet of adhesive material to which a film may be attached. To protect the adhesive sheet from exposure so that the cards do not stick to each other, the adhesive sheet is covered temporarily by a cover sheet. Therefore, in order to apply the film, the cover sheet must be stripped off and the film substituted therefor.

Cards of this type are relatively expensive to manufacture and inconvenient to handle. Moreover, the optical properties of the adhesive serving to bond the film to the transparent sheet are such as to interfere somewhat with the clarity of the projection particularly when chemical changes occur as a result of aging. Another disadvantage of such prior art structures is that since the film is adhesively secured to the card, its later removal for insertion in another card or for some other purpose, is made difficult.

In my prior Patent 2,843,955, issued July 22, 1948, there is disclosed an aperture card wherein the slide or transparency, rather than being permanently adhered to an apertured window, is suspended therein between two transparent panels disposed on either side of the card and secured to the edges of the aperture. The two panels form a protective jacket for the slide, the jacket being loaded simply by inserting the film into a side opening.

Accordingly it is the primary purpose of this invention to provide an improved aperture card wherein the transparent panels acting to suspend the slide in the aperture lie flush with the surface of the card.

More specifically, it is an object of this invention to provide a method for making a suspension-type aperture card wherein a channel is embossed transversely or longitudinally on either side of the card, creating a depression to receive the suspension panels.

A significant advantage of the invention is that the resultant suspension-type apertured card is free of raised or projecting portions. Hence such cards lie perfectly flat, one against another, and when the cards are filed, stacked or otherwise handled, one card does not catch on another to interfere with the operation. This is of great importance in handling cards automatically in data processing systems. Moreover, since the filing space occupied by such flat suspension-type apertured cards is determined by the thickness of the card and is not increased by that of the panels, an economy in storage space is effected thereby.

For a better understanding of the invention, as well as other objects and further features thereof, reference is made to the following detailed description to be read in conjunction with the accompanying drawing, wherein:

FIG. 1 is a plan view of one preferred embodiment of an aperture card in accordance with the invention;

FIG. 2 is a longitudinal section taken in the plane indicated by lines 2—2 of FIG. 1;

FIG. 3 is a plan view of another preferred embodiment of an aperture card;

FIG. 4 is a transverse view taken in the plane indicated by lines 4—4 in FIG. 3; and FIG. 5 is a modified form of apertured card, shown in partial section.

Referring now to FIGS. 1 and 2, there is shown a standard card 10 designed for use in commercially available filing systems and in punched card classifying and sorting machines. The card may be provided with printed indicia or with rows of punches or other code symbols identifying the film slide mounted in the aperture 11. The card may be of single or multiple ply material in any desired thickness, such as 6 to 8 mils, and the window may be rectangular or square with dimensions appropriate to the film slide to be placed therein.

Covering the top side of the aperture is a transparent, rectangular panel 12 of very thin flexible material such as acetate, polyester, vinyl or Mylar, the dimensions of the panel being greater than that of the aperture to define side borders 12A and 12B and end borders 12C and 12D which lie against the edges of the aperture. Covering the bottom side of the aperture is an identical panel 13.

The borders 12B, 12C and 12D of the top panel are bonded to the edges of the aperture, this being accomplished by the use of a suitable adhesive, or by heat and pressure where the panel material is thermoplastic. End border 12A remains unbonded, thereby providing an entrance for a film slide, such as slide 14 shown in FIG. 1. All of the borders of the bottom panel are bonded to the edges of the aperture to fully enclose the bottom face of the aperture.

Thus the two transparent panels overlapping the aperture define a chamber therein whose entrance is the open end border 12A in the top panel. When a slide is inserted through end border 12A, it falls into the aperture and is suspended therein by the panels. When the aperture card is placed in an optical viewer, the image on the slide may be projected without interference through the aperture windows.

In order that the surfaces of the panels 12 and 13 be substantially flush with the record card, two broad channels are indented transversely along the top and bottom surfaces of the card, the width of the channels being sufficient to accommodate the panels. In practice, if the panel material has a thickness, say, of ½ mil, then the channels will have the same depth, so that the exposed surfaces of the panels are co-planar with the surfaces of the card, as best seen in FIG. 2. In this way the card is free of all projections and may be handled in any manner and stacked without catching.

The indentation of the channels may be carried out by passing the cards through embossing rolls which act to compress the cards to form the channels 15 and 16. Alternatively, the channels may be indented by the use of a die press.

The compressed channel surface in advance of the chamber opening at border 12A affords a smooth runway to facilitate the introduction of the slide into the chamber.

The aperture card arrangement shown in FIGS. 3 and 4 is identical to that in FIGS. 1 and 2, except that the channels 17 and 18 are embossed on the card in the longitudinal direction.

In the embodiments shown in FIGS. 1 to 4, the slide is introduced between the top panel and the contiguous channel surface, and is forced therebetween. To slightly enlarge this opening and to prevent any resistance to the film slide, the channel indentation on the upper channel 15′ may be stepped, as shown in FIG. 5, whereby the edge of the channel corresponding to the border 12D of the upper panel is slightly higher than the central portion of the channel overlying the aperture in the card, thereby forming a slit 19 to admit the film slide and to provide an entrance guide therefor.

In manufacturing aperture cards in accordance with the invention, the formation of the depressed channels may be carried out on the card stock by running the cards through embossing rolls, and thereafter die-cutting the apertures in the embossed cards, after which the panels are applied over the apertures. Alternatively, the cards may be apertured before being embossed.

While there have been shown preferred embodiments of suspension-type aperture cards in accordance with the invention, it will be appreciated that many changes and modifications may be made therein without, however, departing from the essential spirit of the invention as defined in the annexed claim.

What is claimed is:

An aperture card of the suspension type, comprising a card having a rectangular aperture therein and a depressed channel roll embossed on either face of said card extending a full dimension of said card and having a width encompassing said aperture, and a panel overlying said aperture within said channel on either face thereof, the borders of the top and bottom panels being bonded to the edges of said aperture except for one portion of the top panel which provides an opening for the suspension compartment, the thickness of said panels being equal to the depth of said channels, whereby the panels are flush with said card.

References Cited by the Examiner

UNITED STATES PATENTS

| 1,617,304 | 2/1927 | Groeschel | 40—158 |
| 2,512,106 | 6/1950 | Langan | 40—158 |
| 2,775,050 | 12/1956 | Ellsworth | 40—159 |
| 2,843,955 | 7/1958 | Engelstein | 40—158 |
| 2,859,550 | 11/1958 | Langan | 40—158 |
| 2,977,017 | 3/1961 | Herzig | 156—108 |
| 3,072,024 | 1/1963 | Wengel | 93—1 |
| 3,090,146 | 5/1963 | Beispel | 40—158 |
| 3,147,561 | 9/1964 | Anderson | 40—158 |

FOREIGN PATENTS 726,139  3/1955  Great Britain.

EUGENE R. CAPOZIO, *Primary Examiner.*

JEROME SCHNALL, *Examiner.*

W. J. CONTRERAS, *Assistant Examiner.*